June 9, 1964  J. C. RENAULT  3,136,078
EARTH WORKING ROLLER UNIT
Filed Oct. 28, 1960  3 Sheets-Sheet 1
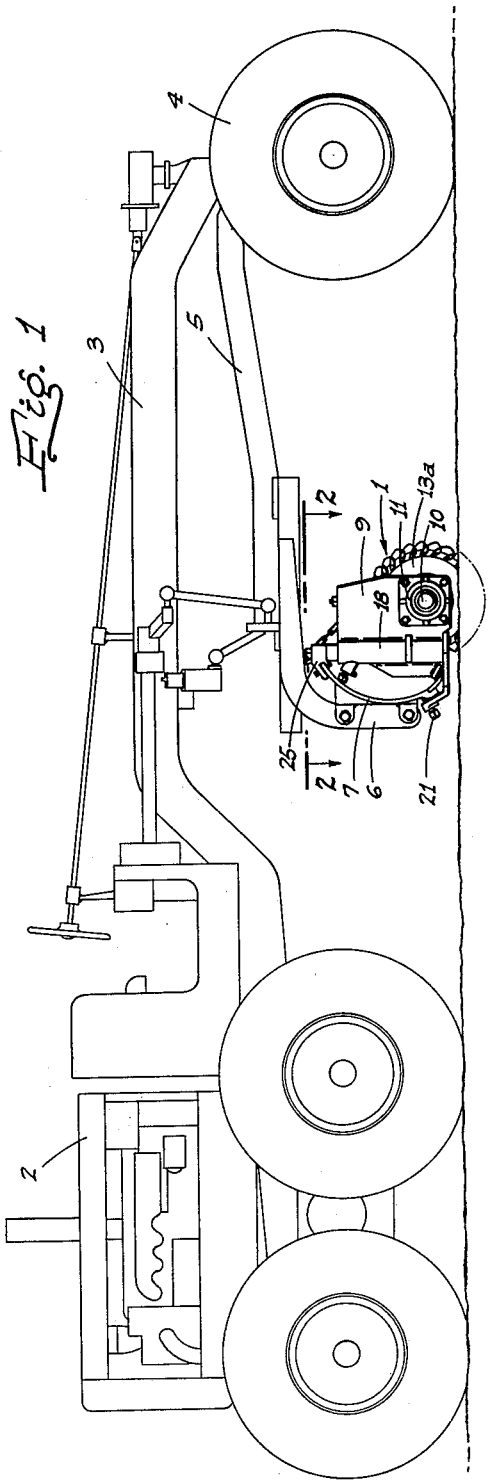
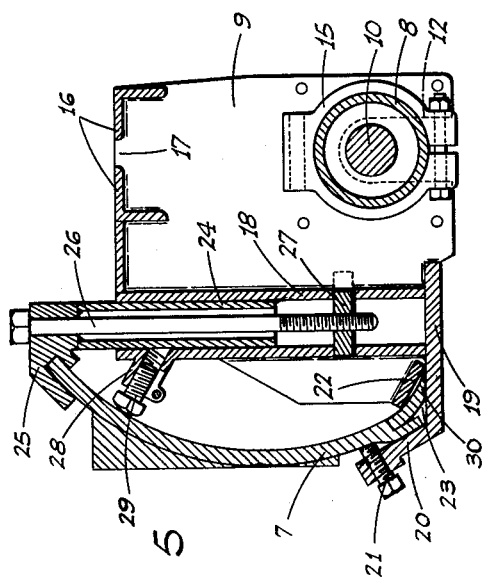
INVENTOR
Jean C. Renault
BY Webster & Webster
ATTORNEYS

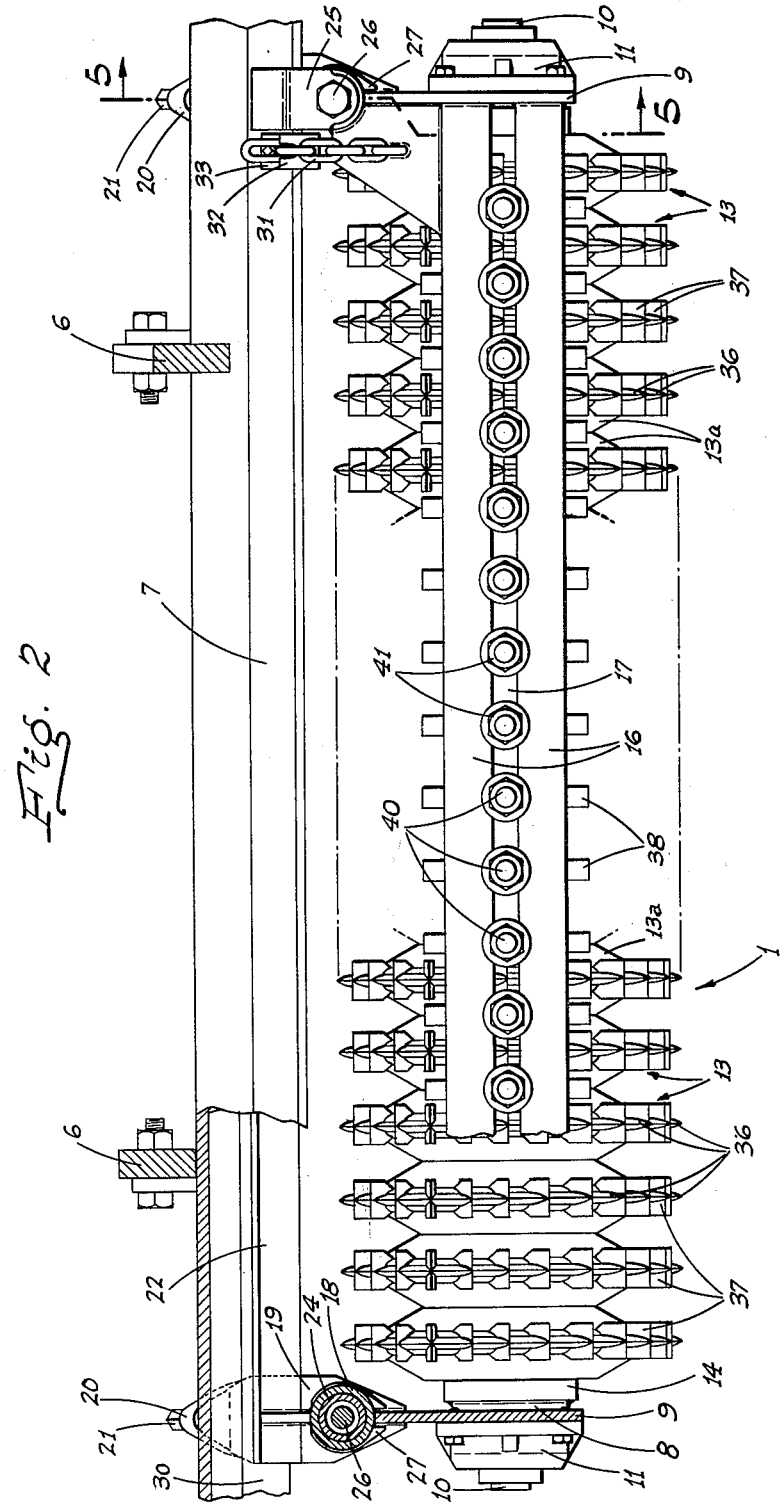

United States Patent Office 3,136,078
Patented June 9, 1964

3,136,078
EARTH WORKING ROLLER UNIT
Jean C. Renault, Salinas, Calif., assignor to Gabilan Iron
and Machine Company, Salinas, Calif., a corporation
of California
Filed Oct. 28, 1960, Ser. No. 65,722
10 Claims. (Cl. 37—146)

The present invention is directed to, and it is a major object to provide, a novel earth working roller unit. Such roller unit while herein shown for the purpose of illustration as being mounted on a motor grader for working a road surface or the like may, in practice, be otherwise mounted, as well as used for different purposes, as for example the working of an agricultural field.

Another important object of the invention is to provide a roller unit which is operative to effectively split, chop, crush to finer size, and blend the material of an earth surface, such as an oil cake road pavement or an agricultural field, which has previously been subjected to an initial rough ripping or chiseling operation.

A still further object of the invention is to provide a roller unit, as above, which is reversible; i.e., when run in one direction has as its primary function the reduction in size and blending of the material, as described in the previous paragraph, and when run in the opposite direction has the primary function of effectively compacting the material previously crushed and blended.

An additional object of the invention is to provide a roller unit, for the purpose herein described, which embodies a plurality of side by side earth working rings of novel form, and which in operation attain the desired functional results.

A further object of the invention is to provide a roller unit which includes, when adapted for use on an implement such as a motor grader, a novel mount for rigidly securing said roller unit on the blade of such implement.

A still further object of the invention is to provide a roller unit which is designed for ease and economy of manufacture, ready mounting, and interchangeability or replacement of the earth working rings when necessary or desired.

It is also an object of the invention to provide a practical, reliable, and durable earth working roller unit, and one which will be exceedingly effective for the purpose for which it is designed.

These objects are accomplished by means of such structure and relative arrangement of parts as will fully appear from a perusal of the following specification and claims.

In the drawings:

FIG. 1 is an end elevation of the roller unit as mounted in connection with the transversely extending scraper blade of a motor grader.

FIG. 2 is an enlarged plan view of the roller taken substantially on line 2—2 of FIG. 1; the view being partly broken away, partly in section, and certain of the earth working rings being omitted.

FIG. 5 is a cross sectional elevation of the roller unit on line 5—5 of FIG. 2.

Figure 3:
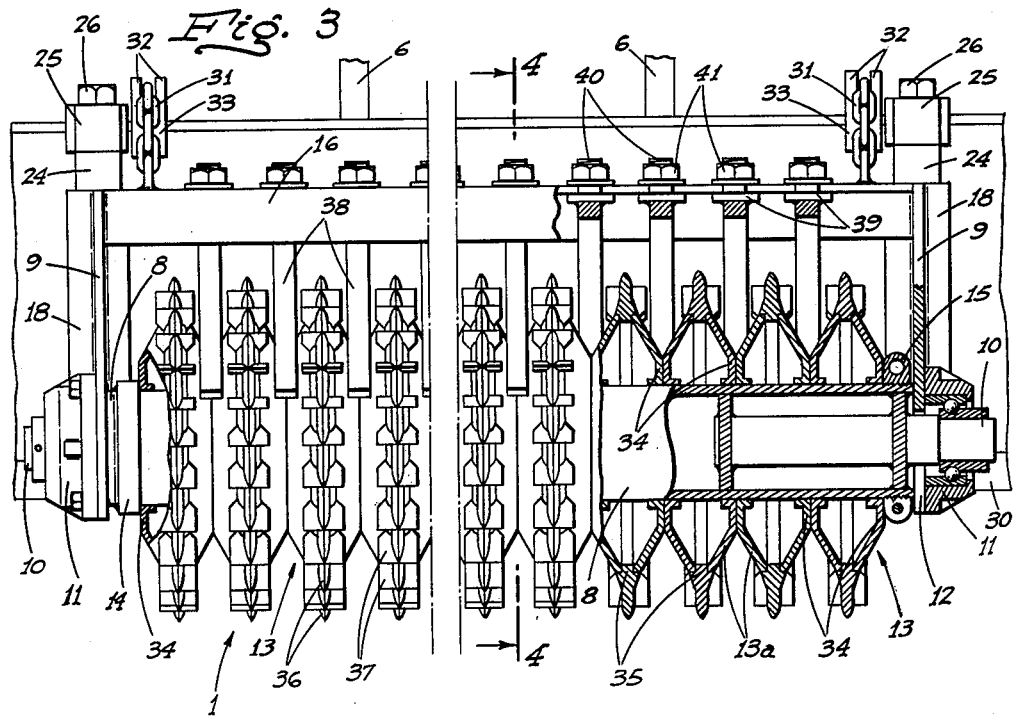
FIG. 3 is an enlarged, foreshortened elevation of the roller unit as in FIG. 1; such unit being partly broken away and partly in section.

Referring now more particularly to the drawings, and to the characters of reference marked thereon, the novel earth working roller unit, indicated generally at 1, is here shown, for the purpose of illustration, as mounted in connection with a motor grader of the type which includes a tractor 2 and a forwardly projecting, above-ground beam structure 3 supported at its front end by a truck 4. A vertically adjustable draft structure 5 extends rearwardly from the truck 4, and by means of brackets 6 supports the usual transverse, forwardly concave scraper blade 7.

All of the foregoing is conventional, and the roller unit 1 in its presently illustrated embodiment is adapted to be mounted in connection with said scraper blade 7 for use; such roller unit 1 comprising the following:

A horizontal, heavy-duty, tubular shaft 8 extends transversely above-ground and between upstanding end plates 9; the tubular shaft 8 being fitted with stub shafts 10 which project from opposite ends of said tubular shaft 8. The stub shafts 10 are carried in bearings 11 secured to the outside of the adjacent end plates 9; such end plates being slotted below the stub shafts 10, as at 12, to permit of ready relatively downward removal of the tubular shaft 8 upon detachment of the bearings 11.

As so mounted, the tubular shaft 8 is freely rotatable, and such shaft carries thereon a multiplicity of earth working rings 13, whose structural characteristics will be hereinafter described. For the present it suffices to state that such earth working rings 13 are engaged on the tubular shaft 8 in end-to-end abutment and as a row extending transversely of the direction of travel; such row of rings abutting at one end against a stop collar 14 on shaft 8, while at the other end said row of rings is pressingly engaged by a rotatably adjustable collar 15 threaded on the adjacent end portion of shaft 8 and normally clamped thereon in fixed position.

The end plates 9, which are vertically disposed and laterally facing, are connected together above the row of earth working rings 13 by a pair of transversely extending top cross beams 16 spaced apart in parallelism to provide a slot 17 for the purpose as will hereinafter appear. The top cross beams 16 thus secure the end plates 9 together in rigid relation.

At the rear edge thereof each end plate 9 is provided, in rigid relation, with an upstanding tubular post 18 initially open at the top and fixed at the bottom on a horizontal base plate 19 which extends rearwardly from the related end plate 9 to a termination rearwardy of the post 18. Each such horizontal base plate 19 includes, at the rear, an upwardly and rearwardly inclined lip 20 having a set screw 21 threaded therethrough from the back side.

An upwardly and rearwardly inclined cross beam 22 is fixed in connection with the upper surface of the base plates 19 and spans therebetween; i.e., extends the full width of the roller unit. Such cross beam 22 terminates, at its upper edge, not only above the upper surface of the base plates 19 but ahead of the lips 20, whereby to form upwardly and rearwardly opening pockets 23.

A tubular sleeve 24 is slidably engaged in each post 18 from the upper end of the latter, and at the top thereof each such sleeve is fitted with a hook-type saddle block 25, the hook or throat portion of which faces rearwardly and downwardly. A headed elongated bolt 26 passes through each saddle block 25, extends downwardly through the corresponding sleeve 24, and at its lower end and below such sleeve the bolt is threaded through a nut block 27 fixed in the related post 18.

Each post 18 is formed, at the rear and adjacent the top, with an integral, upwardly and rearwardly inclined, tubular boss 28 in which a relatively short headed bolt 29 is threaded; such bolt, while being adjustable, normally clamped in fixed position in such boss. The bolts 29 take the pressure of the roller unit when in operation.

To mount the roller unit 1 on the scraper blade 7 of a motor grader or the like, such blade, which includes a transverse cutter edge 30 at the bottom thereof, is first seated on, and spans between, the base plates 19, with the cutter edge 30 engaged in the pockets 23; the lower rear portion of said blade then abutting against the upwardly and rearwardly inclined lip 20.

Thereafter, the sleeves 24, which are started in an elevated position, are run downwardly by the bolts 26 until the hook-type saddle blocks 25 engage over the upper edge of the scraper blade 7; the bolts 26 then being firmly tightened.

Next, the set screws 21 are advanced until they bind against the back of the scraper blade 7, and similarly the bolts 29 are run outwardly until they bind against the front of said blade 7. As so attached to the scraper blade 7 the roller unit 1 is positively and rigidly supported from said blade. In addition, safety chains 31 extend upwardly and rearwardly from opposite ends of the roller unit 1, each chain engaging in a fork 32 of a hook-type saddle block 33 on the adjacent upper edge portion of the scraper blade 7.

As so mounted on such scraper blade 7 the roller unit 1 is ready for use, being adjustable up or down, or angularly, by the conventional mechanism of the mottor grader, and which is normally employed to adjust said blade 7; the cutter edge 30 of the blade 7 being above-ground and out of use when the roller unit 1 is in action.

The earth working rings 13, which provide one of the characteristic features of novelty of the roller unit, are constructed as follows:

Each of the earth working rings 13 is hollow but solid faced, of unitary construction, and comprises a hub 34 which surrounds the tubular shaft 8 with a relatively close fit; the hubs of adjacent rings end-abutting, as shown. Radially outwardly from the hub 34 the spaced sides 13a of each ring 13 taper or slope symmetrically and relatively sharply to an apex, a relatively narrow annulus 35 having a circumferential row of teeth 36 radiating therefrom, and which teeth are canted in the direction of forward rotation as indicated by the arrow in FIG. 4.

In addition to the teeth 36, the annulus 35 of each ring 13 is formed with a circumferential row of outwardly projecting, transverse spades 37; such spades being disposed intermediate adjacent teeth and likewise being canted in the direction of forward rotation. The spades 37 are of substantially greater width than the teeth 36 and annulus 35, and extend laterally thereof in symmetrical relation. The outer ends of the spades 37 are straight transversely of the ring, and such ends terminate slightly inwardly of the outer ends of the teeth 36. Both the teeth 36 and the spades 37 are tapered outwardly to provide relatively sharp working edges.

Figure 4:
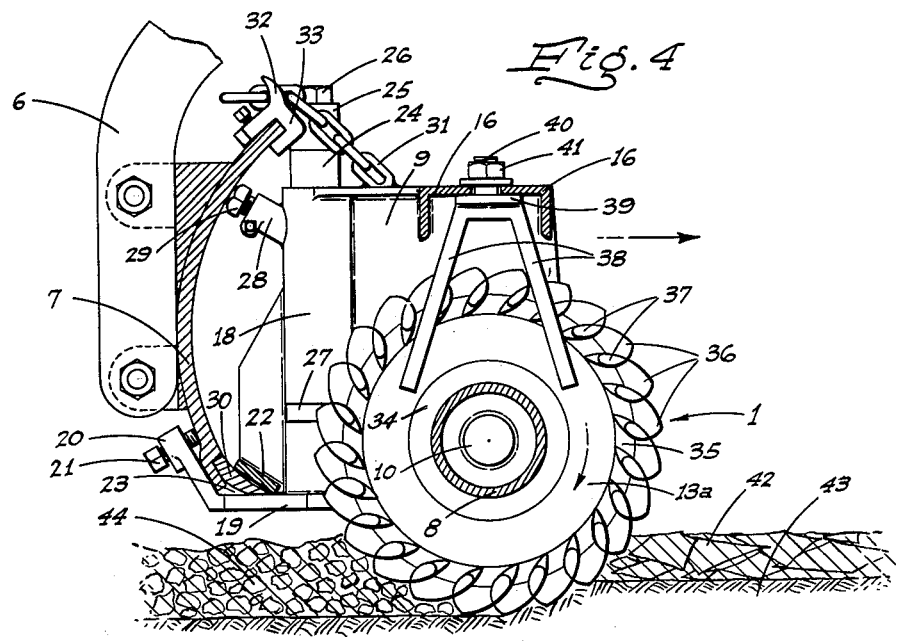
FIG. 4 is a cross sectional elevation of the roller unit on line 4—4 of FIG. 3.

An inverted, substantially U-shaped breaker bar 38 depends in the space between each pair of adjacent rings 13, with the legs of each such bar disposed one ahead and the other rearwardly of the vertical plane of the axis of said rings in straddling relation to the adjacent hub portions of said adjacent rings, as shown in FIG. 4. At the upper end each breaker bar 38 is formed with a head 39 which bears against the under side of the top cross beams 16, spanning the slot 17. A stud 40 upstands from the head 39, projects through the slot 17, and thereabove such stud is provided with a retention nut 41.

In use of the described roller unit 1 and by way of example when mounted on a motor grader working an oil cake road surface, such surface (indicated at 42) is initially or previously rough ripped or chiseled to a certain depth and above the sub-soil 43, as shown in FIG. 4.

Thereafter, with advance of the motor grader with the roller unit 1 set to run at a depth greater than such pre-ripped or chiseled surface 42, the roller unit 1 has forward rotation imparted thereto. With such forward rotation the teeth 36 and the spades 37—producing longitudinal chopping action and transverse chopping action, respectively—reduce or pulverize the surface 42 to relatively small sized material, and at the same time dig up the sub-soil 43 and admix it with the reduced size material from surface 42.

It should be noted that apart from the scraper blade 7 serving as the supporting means for the roller unit 1, and the cross beam 22 serving as a locating and retaining means for the cutter edge 30 of said blade, these parts cooperate with said unit 1 in performing a highly desirable function, as follows:

The cross beam 22, being disposed on a downward incline toward the upwardly moving and oncoming teeth 36 and spades 37 of the roller unit 1, acts as a crusher bar against which medium sized pieces of material are engaged and reduced in size by the adjacent upwardly moving canted teeth 36 and spades 37. This action of course takes place for the full width of the roller unit.

In the course of being crushed against the cross beam 22, a portion of the material is induced upwardly and accumulated between the scraper blade 7 and the adjacent portion of the roller unit 1, forming a storage area for such material. Since this material is engaged by the upwardly moving spades 37, the stored material is stirred and caused to rotate, or boil between the roller unit 1 and blade 7, in a direction contra to that of the roller unit, causing a further reduction in the size of the material (as in a ball mill), and the fines sift down onto the ground to mix with the reduced-size material remaining thereon.

Further, the rear breaker bars 38, arranged as they are, provide stationary elements against which larger pieces of the material are engaged by the paddle action of the forwardly moving spades 37. Since the spades of adjacent roller rings 13 pass quite close to the breaker bars therebetween, as shown in FIG. 3, said spades, cooperating with the breaker bars, form a grinding unit to further reduce such larger pieces of material to a smaller and desirable size. It will be noted that unobstructed space is provided above any row of teeth and spades and the breaker bars therebetween. This provides a safety escape-opening which prevents choking; the material escaping through such opening falling forwardly of the machine onto the surface 42 to again be acted upon by the roller unit 1.

The purpose of the fine grinding thus obtained is to develop material of a size which will fill the spaces between larger unground pieces, leaving a level and more compact surface than would otherwise be the case.

The roller unit 1 is thus quite effective, in combination with the blade 7 and cross beam 22, not only to reduce in size and pulverize the surface 42 and sub-soil 43, but to admix the same for subsequent compaction and oiling; the reduced and admixed material being indicated at 44.

After the roller unit 1 is run forwardly for the accomplishment of the above result it is then run rearwardly, by the motor grader, in a pass on the admixed material 44. When the roller unit 1 is thus run in reverse it accomplishes a compacting action on said mix 44; this by reason of the forward canting of the teeth 36 and spades 37, both of which act as compacting paddles or elements as said roller unit 1 runs in reverse. The roller unit 1 is thus of dual utility.

While upon forward rotation of the roller unit its primary function is to crush and blend or mix the material of an earth surface, such roller unit, because of its substantial weight and downwardly facing surfaces at the bottom, produces a certain amount of deep compaction upon forward travel. Similarly, upon reverse or rearward travel of the roller unit, and while the primary function is then to accomplish compaction, there will also be some continuance of the crushing and mixing or blending action as the bottom portions or edges of the rings and spades work in and through the mixed material.

The arrangement of unit supporting tubular posts 18 with the slidable sleeves 24 therein, in combination with the saddle blocks 25, the base plates 19, the end plates 9 on which the roller unit 1 is mounted, and the bosses 28 with the blade-engaging screws 29 therein, results in a very rigid device, capable of withstanding pressures of 20,000 pounds exerted not only upwardly and rearwardly, but forwardly and away from the blade 7 as well, as when the machine is operating in reverse.

Although the roller unit 1 is herein described as used on a motor grader, and for working an oil cake road surface, it has equal utility for agricultural purposes whether mounted on a motor grader type implement, other type of implement having a blade, or in a separate supporting frame coupled in draft relation to a tractor.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In an earth working roller unit which includes a transverse shaft, a supporting structure for the shaft, and a plurality of side-by-side earth working rings on said shaft; each ring comprising a hub on the shaft, the hubs of adjacent rings contacting each other, a relatively narrow annulus including a circumferential row of teeth projecting outwardly therefrom, the annulus being spaced outwardly from the hub, solid faced sides tapering relatively sharply toward each other from the hub to the annulus whereby to form inverted V-shaped ground-compacting surfaces at the bottom of and between adjacent rings, and a circumferential row of transversely spaced forwardly canted spades projecting from opposite sides of the annulus; and rigid breaker bars depending between adjacent rings and supported by the structure from above the rings, each bar being disposed in symmetrical relation to the sides and spades of such rings and adjacent its lower end straddling the hubs of said rings and terminating adjacent the radially inner ends of the taper sides thereof in relatively close relation thereto.

2. In an earth working roller unit which includes a transverse shaft, a supporting structure for the shaft and a plurality of side-by-side earth working rings on said shaft; each ring comprising a hub on the shaft, the hubs of adjacent rings contacting each other, a relatively narrow peripheral annulus including a circumferential row of teeth projecting outwardly therefrom, the annulus being spaced radially out from the hub, solid faced sides tapering relatively sharply toward each other from the hub to the annulus whereby to form inverted V-shaped ground-compacting surfaces at the bottom of and between adjacent rings; a circumferential row of spaced transversely oriented and forwardly canted spades on each ring on opposite sides of the annulus thereof, breaker bars depending between adjacent rings, fixed beams extending transversely of and above the row of rings and breaker bars and providing a slot therebetween, a head on each bar under the beams in crossing relation to the slot, and a clamping bolt on each head projecting through the slot and detachably securing the head to said beams.

3. An earth working implement comprising, with an upstanding transversely extending concavely curved scraper blade having a cutting edge portion, a ground engaging roller unit in front of the blade in spaced but relatively close relation, the unit including circumferentially spaced transversely oriented forwardly canted spades about the periphery thereof, means rigidly connecting the unit to the blade, and a cross beam mounted on the unit connecting means in contact with and extending over the cutting edge portion of the blade for the full length of the roller unit and projecting forwardly toward but terminating short of said roller unit.

4. An implement, as in claim 3, in which the upper surface of the cross beam slopes down toward the roller unit.

5. An earth working implement comprising, with an upstanding transversely extending concavely curved scraper blade having a cutting edge portion, a ground engaging roller unit in front of the blade in spaced but relatively close relation thereto, the unit including circumferentially spaced parallel sided transversely extending relatively wide and forwardly canted spades about the periphery thereof, and rigid breaker bars depending symmetrically between adjacent rows of spades and radially inward beyond the same adjacent the top of the roller unit and relatively close to the spades.

6. An earth working implement comprising, with an upstanding transversely extending concavely curved scraper blade having a cutting edge portion, a ground engaging roller unit in front of the blade in spaced but relatively close relation thereto, means rigidly mounting the roller unit at its ends in connection with the blade, a cross beam rigid with the mounting means engaging and covering the cutting edge portion of the blade for the full length of the roller unit, and transversely disposed forwardly canted spades on and disposed about the roller unit adjacent the periphery thereof.

7. An earth working implement comprising, with an upstanding transversely extending concavely curved scraper blade having a cutting edge portion, a ground engaging roller unit in front of the blade in scaped but relatively close relation thereto, and having transversely extending and forwardly canted spades to dig into and elevate material over which the roller unit passes, and means detachably mounting the roller unit at its ends in rigid connection with the blade; such last named means comprising rigid substantially vertical post units at the ends of the roller unit immediately in front of the blade, end plates projecting forwardly from the post units and in which the roller unit at its ends is journaled, means on the post units at the top and bottom thereof clampingly engaging the blade at the top and bottom thereof, and a cross beam rigid with the posts extending therebetween and engaging on and over the cutting edge of the blade and coacting with the spades; the roller unit being arranged for rotation in a direction to move the lower portion thereof rearwardly.

8. An implement, as in claim 7, with an adjustable bolt mounted in each post unit at the back and intermediate the ends thereof and pressingly engaged at its rear end with the adjacent face of the scraper blade.

9. In an earth working unit, a transverse shaft, a plurality of earth working rings mounted on the shaft, each ring including a toothed annulus, a shaft engaging hub, symmetrically disposed side walls diverging from the annulus to the hub, and transversely oriented and forwardly canted material-elevating spades arranged in a circumferential row on opposite sides of said annulus; the hubs of adjacent rings substantially contacting each other whereby a relatively wide V-shaped space is formed between adjacent rings, a rigid stationary breaker bar depending into each such space from above the rings, and a supporting structure for the shaft and the upper ends of the breaker bars; each bar being disposed in symmetrical relation to said side walls and the spades and at its lower end substantially engaging the adjacent side walls adjacent their radially inner ends, and forming, with said side walls and the spades, a grinding unit for the material raised by the spades and disposed between adjacent rings.

10. A structure, as in claim 9, in which the outer ends of the spades are straight and such ends are inwardly of the outer ends of the ring teeth.

References Cited in the file of this patent

UNITED STATES PATENTS

| | | |
|---|---|---|
| 57,105 | Emerson | Aug. 14, 1866 |
| 222,362 | Mooers | Dec. 9, 1879 |
| 442,538 | Parker | Dec. 9, 1890 |
| 830,126 | Wilder | Sept. 4, 1906 |
| 1,034,364 | Hanson | July 30, 1912 |
| 1,688,914 | Ariens | Oct. 23, 1928 |
| 1,782,201 | Dunham | Nov. 18, 1930 |
| 1,883,404 | Ronning | Oct. 18, 1932 |
| 1,996,676 | Hargrave | Apr. 2, 1935 |
| 2,036,598 | Miller et al. | Apr. 7, 1936 |
| 2,197,549 | Hargrave et al. | Apr. 16, 1940 |
| 2,315,883 | Uddenborg | Apr. 6, 1943 |
| 2,962,947 | MacDonald | Dec. 6, 1960 |
| 3,015,259 | Apel et al. | Jan. 2, 1962 |
| 3,063,177 | McAdams | Nov. 13, 1962 |